(12) United States Patent
Tanaka et al.

(10) Patent No.: US 7,773,268 B2
(45) Date of Patent: *Aug. 10, 2010

(54) PRINT DESIGNATING METHOD AND APPARATUS, AND PRINTING METHOD AND APPARATUS

(75) Inventors: Hiroshi Tanaka, Asaka (JP); Mikio Watanabe, Asaka (JP)

(73) Assignee: Fujifilm Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/336,795

(22) Filed: Jan. 23, 2006

(65) Prior Publication Data

US 2006/0119893 A1 Jun. 8, 2006

Related U.S. Application Data

(62) Division of application No. 09/574,453, filed on May 19, 2000, now Pat. No. 7,057,745.

(30) Foreign Application Priority Data

May 21, 1999 (JP) ................................. 11-141498

(51) Int. Cl.
 *H04N 1/387* (2006.01)
 *G06F 15/00* (2006.01)
(52) U.S. Cl. ..................... 358/453; 358/1.1; 358/1.16
(58) Field of Classification Search .............. 358/1.1, 358/1.9, 1.11–1.18, 401, 452, 453, 479, 527; 348/32, 231.7; 382/232, 233
See application file for complete search history.

(56) References Cited

U.S. PATENT DOCUMENTS

| 5,764,807 A | 6/1998 | Pearlman et al. ............ 382/240 |
| 5,953,008 A | 9/1999 | Hagiuda ..................... 345/630 |

(Continued)

FOREIGN PATENT DOCUMENTS

JP 6-8537 1/1994

(Continued)

OTHER PUBLICATIONS

Japanese Office Action dated Feb. 2, 2007 with English translation.

*Primary Examiner*—Thierry L Pham
(74) *Attorney, Agent, or Firm*—McGinn IP Law Group PLLC

(57) ABSTRACT

In a digital camera that can perform print designation, a print designation file for writing jobs for printing is prepared in a memory card in which image data is recorded, and information for specifying a file to be printed (FILE_ID), file identifying information for identifying whether the file to be printed is a moving image file or a still image file (FILE_TYPE), and information for specifying a scene to be printed in the moving image if the file to be printed is the moving image file (FRAME_NUM) are stored in the print designation file. A printing device reads the print designation file from the memory card, then takes out the image data to be printed from the memory card in accordance with the read information and executes printing. Thus, it is possible to perform the print designation of the specified image in the moving image without wasting the memory capacity in the recording medium.

6 Claims, 8 Drawing Sheets

U.S. PATENT DOCUMENTS

| | | | |
|---|---|---|---|
| 6,295,086 B1 | 9/2001 | Fukushima et al. | 348/231.1 |
| 6,453,071 B2 * | 9/2002 | Ito et al. | 382/232 |
| 6,469,737 B1 | 10/2002 | Igarashi et al. | 530/350 |
| 6,553,382 B2 | 4/2003 | Hatori | 707/102 |
| 6,573,927 B2 * | 6/2003 | Parulski et al. | 348/32 |
| 7,057,745 B1 * | 6/2006 | Tanaka et al. | 358/1.1 |

FOREIGN PATENT DOCUMENTS

| | | |
|---|---|---|
| JP | 6-315107 | 11/1994 |
| JP | 7-99628 | 4/1995 |
| JP | 8-147326 | 6/1996 |
| JP | 9-134266 | 5/1997 |
| JP | 10-136299 | 6/1998 |
| JP | 10-171027 | 6/1998 |
| JP | 11-78131 | 3/1999 |
| JP | 11146309 A * | 5/1999 |

* cited by examiner

F I G. 2
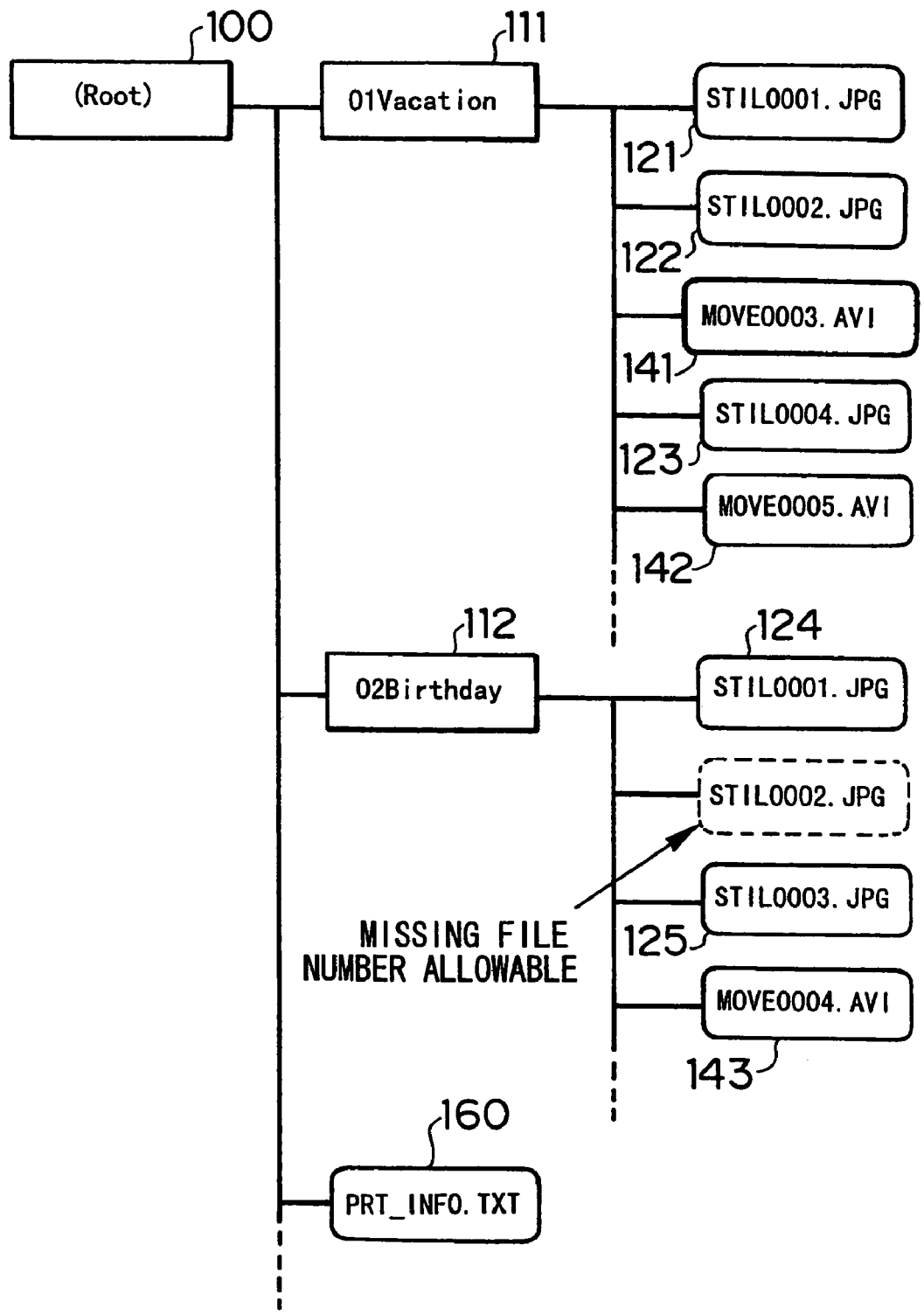

F I G. 4

```
{
JOB_ID=01
PRINT_TYPE=STANDARD
QUANTITY=2
FILE=¥01Vacation¥STIL0001.JPG
FILE_TYPE=JPEG
}
```

```
{
JOB_ID=02
PRINT_TYPE=STANDARD
QUANTITY=3
FILE=¥01Vacation¥STIL0002.JPG
FILE_TYPE=JPEG
}
```

```
{
JOB_ID=03
TYPE=STANDARD
QUANTITY=2
FILE=¥01Vacation¥MOVE0003.AVI
FILE_TYPE= AVI
OFFSET= 0x000AD73E
LENGTH= 0x00005614
}
```

```
{
JOB_ID=04
PRINT_TYPE=STANDARD
QUANTITY=1
FILE=¥02Birthday¥STIL0003.JPG
FILE_TYPE=JPEG
}
```

160

PRINT DESIGNATING METHOD AND APPARATUS, AND PRINTING METHOD AND APPARATUS

The Present Application is a Divisional Application of U.S. patent application Ser. No. 09/574,453, filed on May 19, 2000 now U.S. Pat. No. 7,057,745.

BACKGROUND OF THE INVENTION

1. Field of the Invention

The present invention relates generally to a print designating method and apparatus and printing method and apparatus, which are applied to a digital camera and a printer and so forth. More specifically, the present invention relates to a print designating method preferable for designating printing of a specified scene of a moving image in a camera that can electronically capture and record a moving image through an imaging device, a method for printing the designated image, and apparatus achieving the methods.

2. Description of Related Art

An image captured by a digital camera and the like is recorded in a recording medium such as a memory within the camera or a detachable memory card. The image can be displayed on a display device such as a liquid crystal monitor, and it can also be printed by a personal printer and appreciated. In addition, digital printing service (hereunder called a lab print service) has started for receiving from customers the recording medium in which image data is recorded and providing pictures of the images (still images) recorded in the recording mediums by means of printing.

Japanese Patent Application Laid-open No. 6-315107 discloses a camera that has both a moving image record mode and a still image record mode, and records in the recording medium a moving image or a still image by switching the record modes. Japanese Patent Application Laid-open No. 7-99628 discloses a camera which can take out more than one specified image from the moving image or the recorded moving image and prepare still image data that is independent from the moving image data so as to be able to record the still image as well.

If a user desires printing of the still image by the lab print service and the printer, it is becoming common to capture the still image using an electronic still camera. In some cases, however, it has been required to print a specific scene in the moving image as a still image that was captured without intending to print at the time of capturing. In such a case that the scene is always moving, capturing of a satisfactory still image is difficult. Consequently, another need is suggested in that images are captured and recorded as moving images during capturing, then the best moment (a scene) is selected to be printed.

In the above-described circumstance, although print designation to a recorded still image is possible, the specific scene of the moving image captured with the camera of Japanese Patent Application Laid-open No. 6-315107 cannot be designated to be printed. Japanese Patent Application Laid-open No. 6-8537 discloses a printer that is adaptable for the print designating method used for services such as the lab print service; however, this printer cannot print the specific scene of the moving image that is designated beforehand.

By the camera of Japanese Patent Application Laid-open No. 7-99628, the print designation for the specific scene of the moving image is possible since the specific scene can be taken out as a still image; however, the image data of the taken still image should be stored redundantly with the image data of the moving image, and the memory capacity of the recording medium is wasted.

SUMMARY OF THE INVENTION

The present invention has been developed in view of the above-described circumstances, and has as its object the provision of the print designating method that can designate printing of the specific scene in the moving image without wasting the capacity of the recording medium, and the printing method for printing the image designated by the designating method and the apparatus to perform the method, and also the provision of the printing apparatus.

In order to achieve the above-described object, the present invention is directed to a print designating method, comprising the step of: storing, in a print designation file in a recording medium in which a file including image data is stored, print designating information to designate an image to be printed stored in the recording medium, wherein the print designating information includes: file specifying information for specifying a subject file including the image to be printed; and file type identifying information for identifying whether the subject file is a moving image file or a still image file, wherein if the subject file is the moving image file, the print designating information further includes scene specifying information for specifying a subject scene to be printed in the moving image file.

According to the present invention, a scene to be printed in the moving image file is specified and information for the specified scene in the moving image file is extracted; thus the still image data for the specific scene does not have to be prepared separately. Hence, the print designation of the still image and the print designation of the still image of the specified scene in the moving image can be achieved with a single print designation file, without wasting the memory capacity of the recording medium.

To provide a method for executing printing in accordance with print designating information that is designated by the above-described print designating method, the present invention is directed to a printing method for printing an image designated with print designating information stored in a print designation file in a recording medium in which a file including image data is stored, wherein the print designating information includes: file specifying information for specifying a subject file including the image to be printed; and file type identifying information for identifying whether the subject file is a moving image file or a still image file, wherein if the subject file is the moving image file, the print designating information further includes scene specifying information for specifying a subject scene to be printed in the moving image file, wherein the printing method comprises the steps of: reading the subject file from the recording medium in accordance with the file specifying information; and determining whether the subject file is the still image file or the moving image file in accordance with the file type identifying information, wherein if the subject file is determined as the still image file in the determining step, the printing method further comprises the step of printing the image data in the subject file, wherein if the subject file is determined as the moving image file in the determining step, the printing method further comprises the steps of: reading the scene specifying information; taking the image data out of the subject scene in the moving image file in accordance with the scene specifying information; and printing the image data of the subject scene.

The present invention is also directed to a print designating device, comprising: a print designation file preparing device which stores, in a print designation file in a recording medium in which a file including image data is stored, print designating information to designate an image to be printed stored in the recording medium, wherein the print designating information includes: file specifying information for specifying a subject file including the image to be printed; and file type identifying information for identifying whether the subject file is a moving image file or a still image file, wherein if the subject file is the moving image file, the print designating information further includes scene specifying information for specifying a subject scene to be printed in the moving image file.

The present invention is also directed to a printing device for printing an image designated with print designating information stored in a print designation file in a recording medium in which a file including image data is stored, wherein the print designating information includes: file specifying information for specifying a subject file including the image to be printed; and file type identifying information for identifying whether the subject file is a moving image file or a still image file, wherein if the subject file is the moving image file, the print designating information further includes scene specifying information for specifying a subject scene to be printed in the moving image file, wherein the printing device comprises: a print designation file reading device which reads the print designation file in the recording medium; a subject file reading device which reads the subject file from the recording medium in accordance with the file specifying information in the print designation file; a file type determining device which determines whether the subject file is the still image file or the moving image file in accordance with the file type identifying information in the print designation file; and a print controlling device, wherein if the subject file is determined as the still image file by the file type determining device, the print controlling device executes printing of the image data in the subject file, wherein if the subject file is determined as the moving image file by the file type determining device, the print controlling device reads the scene specifying information in the print designation file, takes the image data out of the subject scene in the moving image file in accordance with the scene specifying information, and executes printing of the image data of the subject scene.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 2 is a schematic view showing a file structure of a memory card;

FIG. 4 is a view showing another example of the print designation file;

DETAILED DESCRIPTION OF THE PREFERRED EMBODIMENT

Hereunder a preferred embodiment will be described in detail for a print designating method and apparatus and a printing method and apparatus with reference to the accompanying drawings.

Figure 1:
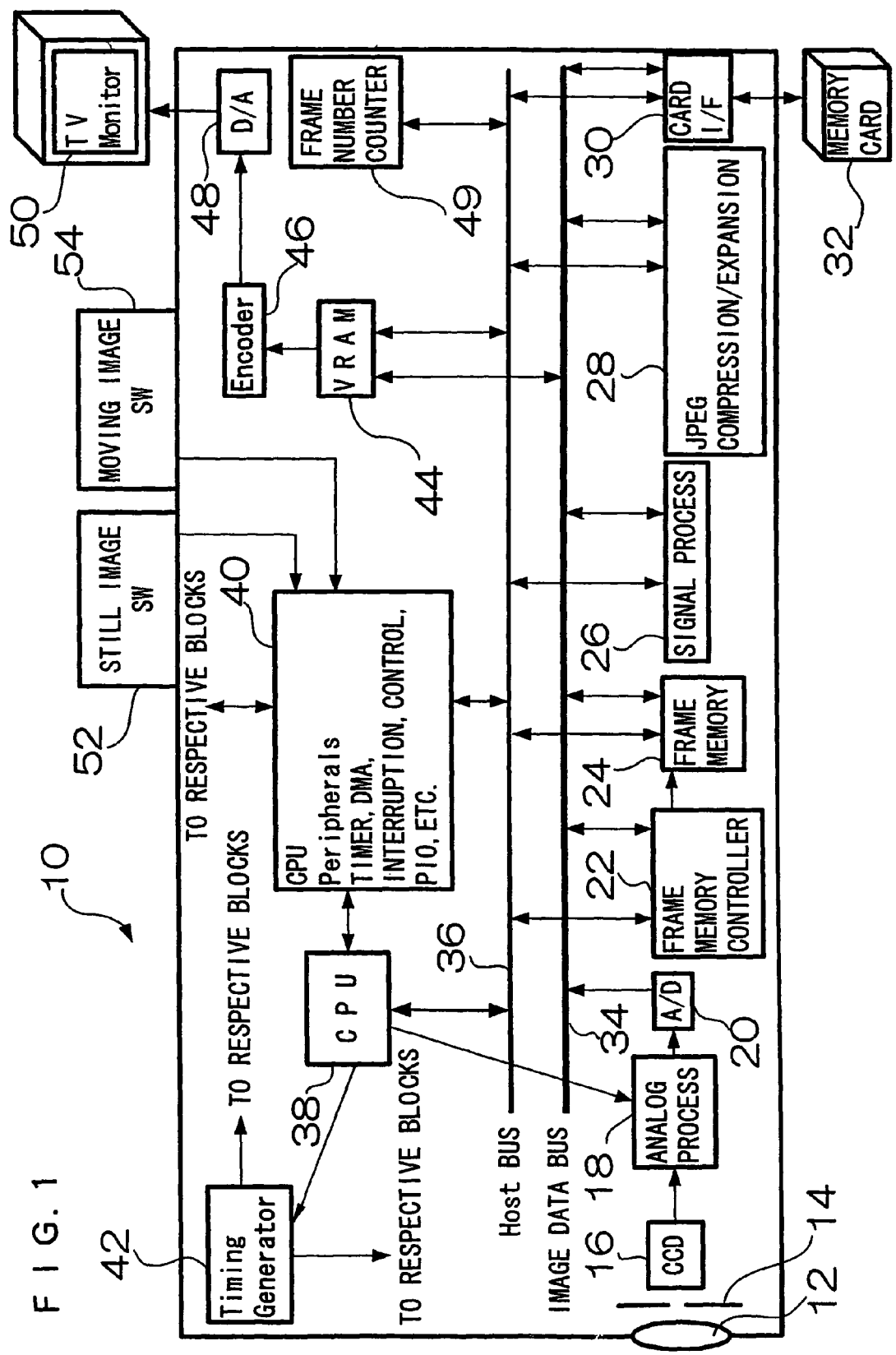
FIG. 1 is a block diagram showing a structure of a digital camera to which the present invention is applied.

FIG. 1 is a block diagram showing an example of a digital camera 10 to which an embodiment of the present invention is applied. The digital camera 10 comprises a taking lens 12, a mechanical shutter 14, which also serves as an iris, a solid-state imaging device or a charge-coupled device (CCD) 16, an analog signal processing part 18, an A/D converter 20, a frame memory controller 22, a frame memory 24, a digital signal processing part 26, a Joint Photographic Experts Group (JPEG) compression-expansion circuit 28, a card interface 30, to which a memory card 32 is operatively connected, an image data bus 34, a host bus 36, a central processing unit (CPU) 38, a CPU peripheral circuit 40, a timing generator 42, a video random-access memory (VRAM) 44, an encoder 46, a D/A converter 48, and a frame number counter 49, and so forth.

The CCD 16 has a function to thin out a signal electric charge in a vertical direction when reading out the signal electric charge from a photosensitive pixels, which are arranged in a light receiving part in a two-dimensional manner. When capturing a moving image, the CCD 16 reads out the signal electric charge while thinning out the signal electric charge in the vertical direction; whereas the CCD 16 reads out data of all pixels without thinning out when capturing a still image. The signals that are read out from the CCD 16 are performed processes in the analog signal processing part 18 such as gain adjustment, color separation, and other predetermined analog signal processes, then the signals are converted into digital signals by the A/D converter 20. The digitized image data is converted into a brightness signal (Y signal) and a color difference signal (Cr and Cb) in, the digital signal processing part 26, and is temporarily stored in the frame memory 24.

The image data stored in the frame memory 24 is compressed in the JPEG compression-expansion circuit 28, which is used commonly by both moving image recording and still image recording, and is recorded as compressed data in the memory card 32 via the card interface 30. The writing (recording) of the data into the memory card 32 is simultaneously performed with the compressing process. The memory card 32 is, for example, a solid-state floppy disk card (SSFDC), which is a card type IC memory called a smart medium. The recording medium is not limited to the memory card 32; various forms such as a PC card, a magnetic disk, an optical magnetic disk, and a memory stick are acceptable.

The JPEG compression-expansion circuit 28 is used for both recording the still image and recording the moving image. The still image is recorded as a JPEG file, and the moving image is recorded as a motion JPEG file.

When recording the moving image, the image data stored in the frame memory 24 is read through the frame memory controller 22 while being thinned out in a horizontal direction (or in both horizontal and vertical directions), then the image data is passed to the JPEG compression-expansion circuit 28.

The brightness signal and color difference signal (YC signals) that are obtained in the digital signal processing part 26 are supplied to the VRAM 44. The data stored in the VRAM 44 is outputted to the outside by a video output terminal via the encoder 46 and the D/A converter 48, and is supplied to the display device 50 such as a monitor TV, thereby the image, captured by the CCD 16, is displayed on the display device

50. The display device 50 may comprise a liquid crystal display built in the digital camera 10.

In a reproducing mode, the image data recorded in the memory card 32 is read out, and is expanded by the JPEG compression-expansion circuit 28 and supplied to the VRAM 44. The data stored in the VRAM 44 is outputted to the outside through the video output terminal via the encoder 46 and the D/A converter 48, and is supplied to the display device 50 and the like. Thereby, contents of the image data stored in the memory card 32 can be observed on a screen of the display device 50.

The user can set a mode of the camera at a still image settle mode for printing through a mode selection switch (not shown) so as to temporarily stop the reproduced moving image at the desired scene during reproduction (or a slow reproduction) of the moving image file, and then can specify the still image to be printed by a predetermined operation such as pressing with a print selection button. By the predetermined operations, the information for specifying the image to be printed can be automatically obtained, and can be recorded as the scene specifying information in the print designation file, which will be described later.

The CPU 38 serves as a controller to control the entire system, and supervises the circuits in accordance with signals that are outputted from various operation switches and are received through the CPU peripheral circuit 40. The operation switches include a still image recording instruction switch (a release switch) 52 and a moving image recording instruction switch (a video-recording switch). The CPU 38 also controls the timing generator 42, which supplies synchronizing signals to respective blocks so that the blocks are synchronized. The CPU peripheral circuit 40 comprises a timer, a direct memory access (DMA) circuit, an interruption control circuit, and a parallel input/output port.

The frame number counter 49 counts one by one (+1) every time a frame is expanded from the moving image file.

FIG. 2 shows a file structure of the memory card in the digital camera 10 in this embodiment. As shown in FIG. 2, directories (111 and 112) for classification are prepared under a root directory (Root) 100, and still image files (121, 122, . . . ) and moving image files (141, 142, . . . ) are, stored in a parallel manner under the directories (111 and 112). These directory names and file names have directory number (numbers at the first two letters of the directory name) and the file number (numbers at the last four letters of the directory name), respectively. The desired still image file or moving image file in the memory card 32 can be specified by the frame number with the combination of the directory number and the file number. For example, the moving image file "MOVE0003.AVI" indicated by the reference number 141 is specified by the frame number "01-0003" comprising the directory number "01" and the file number "0003".

If the still image file of the frame number "02-0002" is deleted as shown in a broken line in FIG. 2, the file number will be a missing number; unless the user will perform frame number correction, the frame number once assigned is not changed.

As shown in FIG. 2, the directory 111 named "01Vacation" and the directory 112 named "02Birthday" are provided under the root 100, in which the directory 111 stores the image file related to the vacation and the directory 112 stores the image file related to the birthday. File names of the still images and file names of the moving images are named to begin with the four letters "STIL" and the four letters "MOVE", respectively, thereby the image file of the specific frame number can be distinguished between the still image file or the moving image file from the file name. Additionally, such distinguishing of the file types is possible also by distinguishing "JPG" and "AVI" of the extension of the file.

A print designation file ("PRT_INFO.TXT") 160 is stored directly under the root directory 100 of the memory card 32. The following description takes an example with a file (¥01Vacation¥MOVE0003.AVI (frame number 01-0003)) indicated with the reference number 141 as the moving image that is the subject image designated to be printed.

Figure 3:
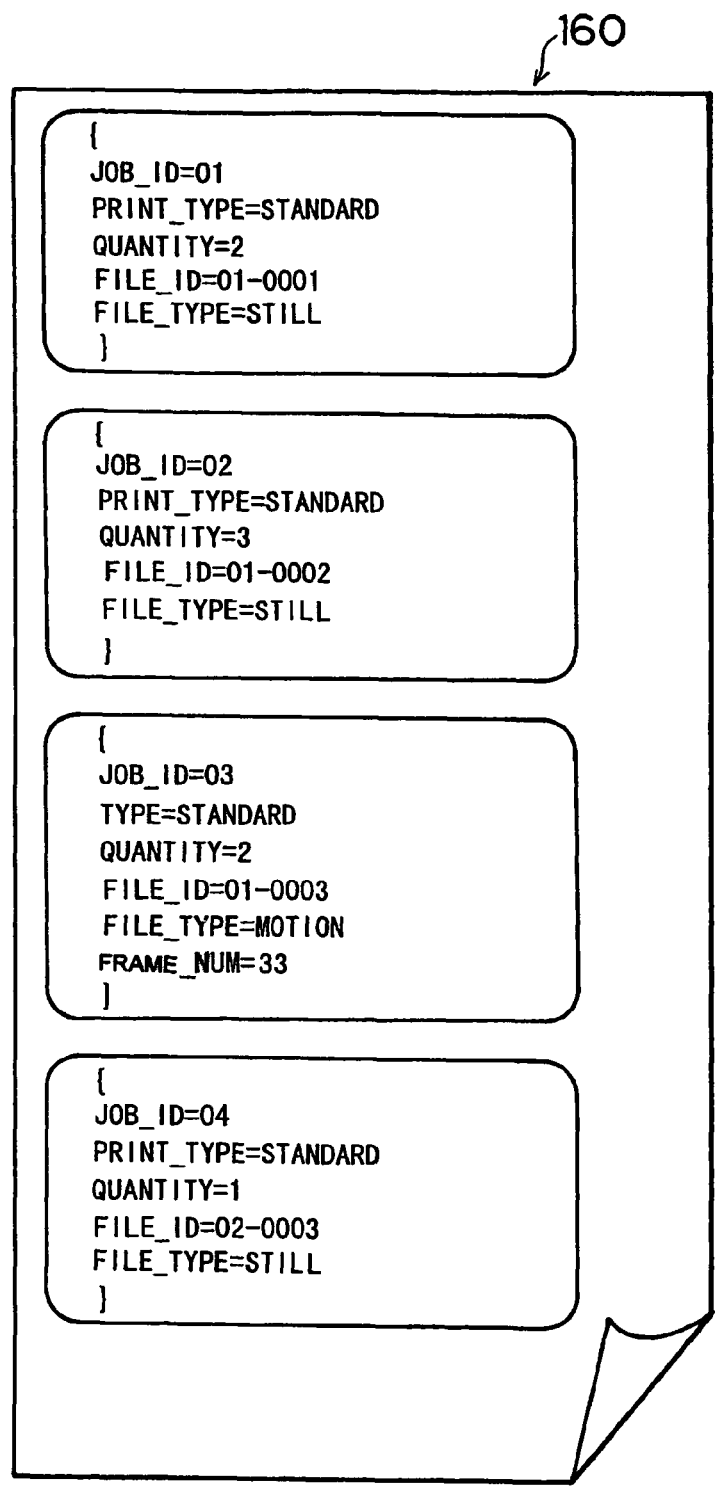
FIG. 3 is a view showing an example of a print designation file.

FIGS. 3 and 4 show examples of the print designation file 160. The print designation file 160 is a Text file in which data necessary for every print JOB is summarized and completed to be written. A job ID (JOB_ID) is assigned to each print JOB. The first job of the print designation file 160 is numbered as the first "01", and the job Ids (JOB_ID) are assigned afterwards by the sequential numbers 02, 03, . . . .

In each job, designated are a print type (PRINT_TYPE), number of printing (QUANITY), image data to be printed (FILE_ID), distinguishing between the moving/still image of the file (FILE_TYPE), and a frame number (FLAME_NUM) of the image data of the scene to be printed in case of the moving image. Designation to each job is written in a pair of brackets "{ }".

A job of JOB_ID=03 in FIG. 3 is the job for designating printing the moving image file (141) of ¥01Vacation¥MOVE0003.AVI. Print type is designated from one of the three types, which are index, standard (STANDARD), and seal. In the job of JOB_ID=03, the print type is set as "STANDARD".

The image file that is designated to be printed is specified by referring to the frame number (01-0003) in the FILE_ID. A means to specify a file to be printed may be writing a path (an absolute path or a relative path) indicating where the file is stored as shown in FIG. 4 instead of writing the frame number.

Whether the image file to be printed is the moving image file or the still image file can be determined by reading the identification of the file type "FILE_TYPE" which corresponds to file type identifying information. In the example shown in FIG. 3, writing is performed for directly distinguishing the still/moving image, such as: if the image file to be printed is the still image file, the identification is "STILL" in "FILE_TYPE", and if the image file is the moving image file, the identification is "MOTION" in "FILE_TYPE".

As shown in FIG. 4, writing the file type may be writing the format name of the mage file (format names such as JPEG, TIFF and Bitmap indicate the still images, and format names such as AVI and MPEG indicate the moving images). Alternatively, the file type can be identified with an extension of the image file (JPG, TIF, BMP, AVI, MPG, and the like) or the initial letters ("STIL" or "MOVE") of the file name, without a written format name.

As to specifying the scene for deciding which image data of the scene in the moving image file is printed if the file to be printed is the moving image file, such specifying is achieved in the present embodiment by writing the frame number (FLAME_NUM). The actual data of the moving image file comprises chunks of audio data and chunks of image data as shown in FIG. 5, which will be described later; thus the number except the chunks of the audio data from the actual data is written as the frame number.

In specifying a frame to be printed, it is not restricted to the frame number. As shown in FIG. 4, a start position (OFFSET) of the chunk of the data to be printed may be written. In this case, a length (LENGTH) of the chunk of the image data may be written together with the OFFSET. The OFFSET may be an offset from the last of header information as shown in FIG. 5, or an offset from the top address of the moving image file.

A typical AVI file format does not include the length of the header in each chunk; however the LENGTH is written as the format that includes the header in each chunk in this embodiment.

Figure 5:
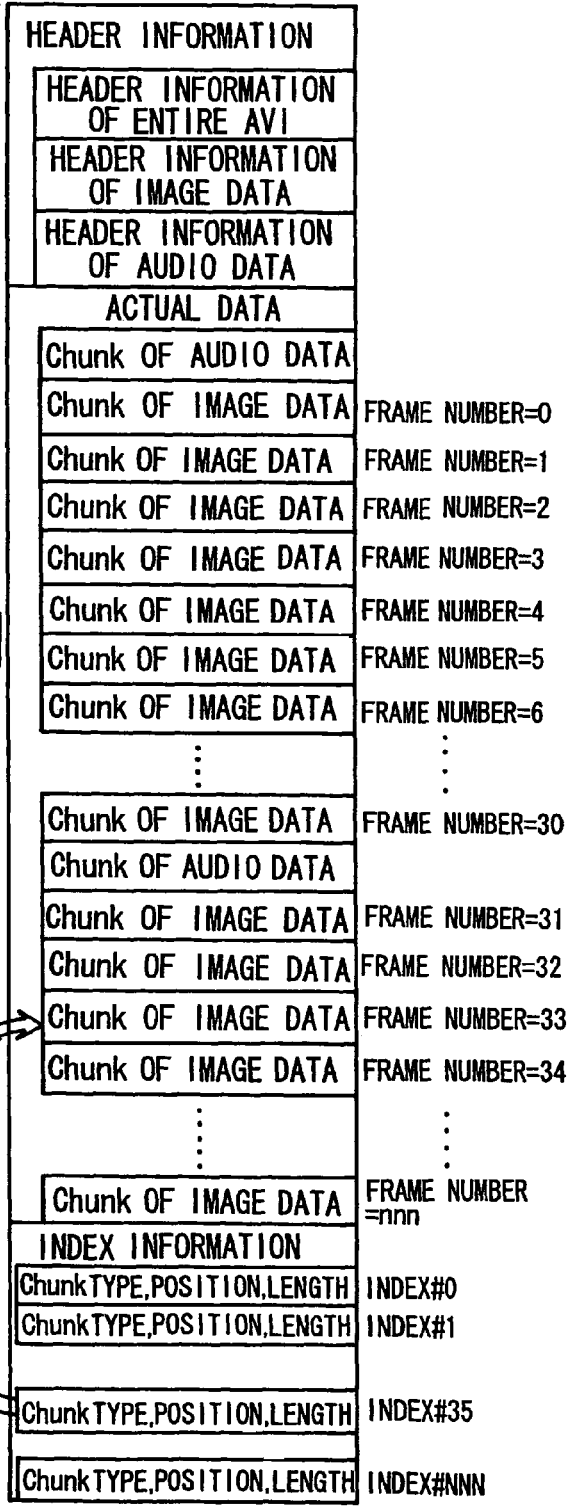
FIG. 5 is a view showing an example of a data structure of a moving image file.

FIG. 5 shows an example of a structure of the moving image file. As shown in FIG. 5, in the AVI file format, the moving image file has the header information at the top, the actual data, which is the assembly of the chunks, and then Index information at last.

The header information comprises header information of the entire AVI file, header information of the image data, and header information of the audio data. The chunk of the actual data has two types: the chunk of the image data and the chunk of the audio data. The chunk of the audio data is inserted one in 16 chunks, for example. In this case, the frame numbers are defined in an order of the chunks of the image data except the chunks of the audio data. The audio file may be recorded independently other than this example. The audio data is obtained by converting a signal from a microphone (not shown) from analog to digital.

Index information, which is added to the last part of the moving image file, has a list of types (image data or audio data), positions (OFFSET), and lengths (LENGTH) of all the chunks stored in the moving image file.

For example, the index information (Index#35) of the image data of a frame number 33 that is the scene to be printed is: chunk type=image; position (OFFSET)=0x000AD73E; and length (LENGTH)=0x00005614.

When printing the moving image file in FIG. 5 in accordance with the job of JOB_ID=03 in FIG. 3 using a printing apparatus (printer), the printing apparatus skips the header, then skips the chunks from the top while counting them, and when the printing apparatus reaches at the image data of the file number that is written in the print designation file 160, the printing apparatus obtains the image data to be printed. Alternatively, the printing apparatus first reads the position (and the length) of the chunk of the frame number that is written in the print designation file from the index information that is recorded at the last part of the moving image file, and accesses the chunk of the actual data and obtains the image data to be printed.

Next, a description will be given to the printing apparatus for printing in accordance with the data of the print designation file mentioned above.

Figure 6:
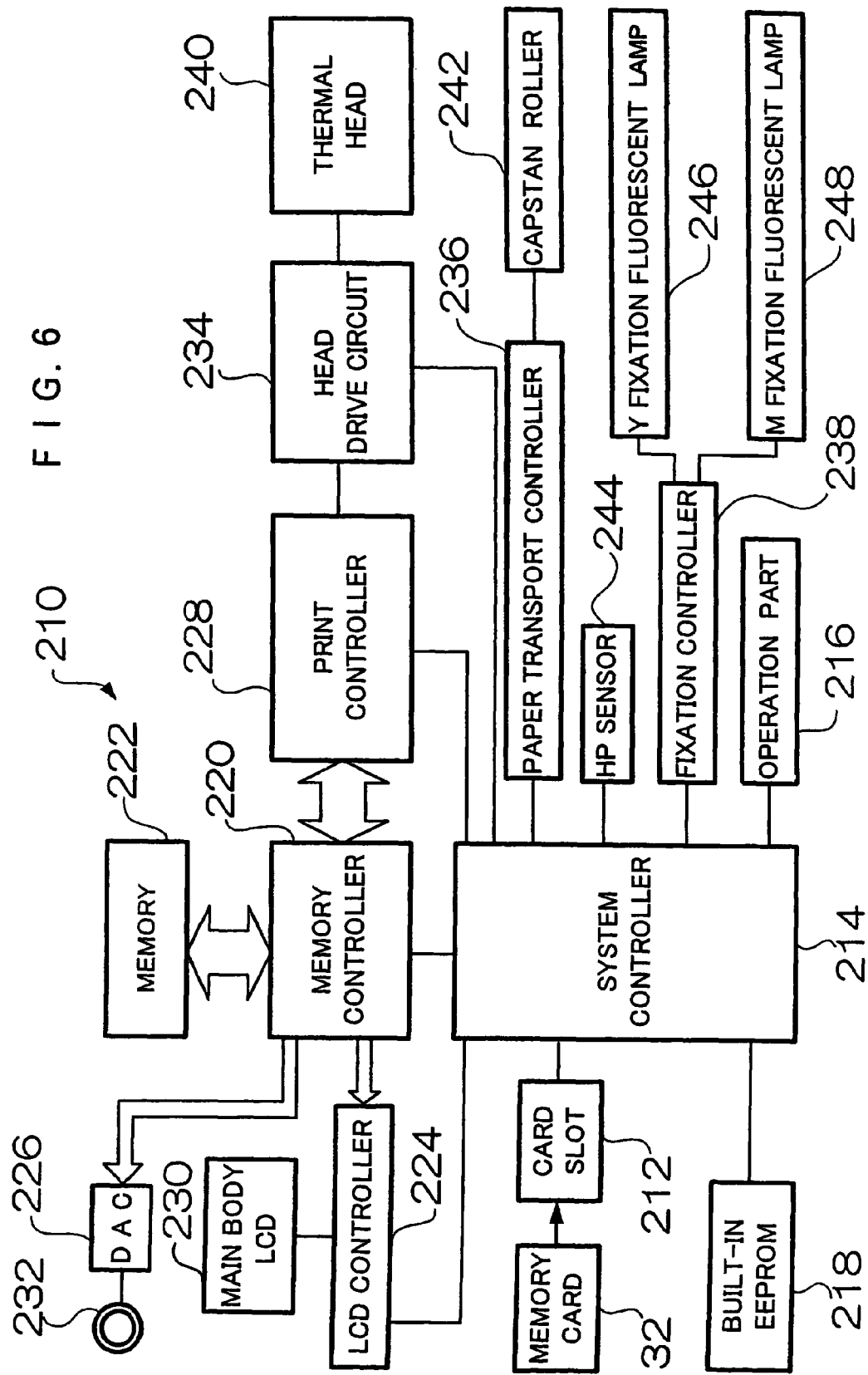
FIG. 6 is a block diagram showing a structure of a printing apparatus to which the present invention is applied.

FIG. 6 is a block diagram showing a structure of a printing apparatus to which the present invention is applied. The printing apparatus 210 is applied a printing method called Thermo-Autochrome (TA), in which printing paper (TA paper) is used which is colored as heat is applied and is fixed as ultraviolet light is applied.

The printing apparatus 210 is provided with a card slot 212 to which the memory card 32 is loaded, so that the image recorded by the digital camera 10 and the like in the memory card 32 can be directly read into the printing apparatus 210 and printed on the printing paper.

A system controller 214 is a processing part for controlling the entire system of the apparatus. The system controller 214 processes the image data, and exchanges image data and gives respective type of instructions such as print execution with respect to each control block. The instructing respective process to the system controller 214 is given from an operation part 216 in accordance with the user's operation, and a program of the system controller 214 is recorded in a nonvolatile memory (EEPROM) 218, which is built in the apparatus.

The card slot 212 in which the memory card 32 is loaded reads out the image data of the image file recorded in the memory card 32, and inputs the read image data to the system controller 214, and the reading out of the image data is performed by following the instruction of the system controller 214. The image data is compressed and recorded in the memory card 32 in the predetermined format. When the system controller 214 instructs to the card slot 212 to read out the image data and obtains the required image data from the memory card 32, the system controller 214 expands the image data to restore, it to the original image data, and further performs the required processes on the image data and stores the image data in a memory 222 via a memory controller 220.

The memory controller 220 is a processing part for controlling writing-in and reading-out of the data with respect to the memory 222. The image data that is read out from the memory card 32 is stored in the memory 222 by the processing of the memory controller 220. The image data in the memory 222 is outputted to a liquid crystal display (LCD) controller 224, a D/A converter 226, and a print controller 228, and so forth in accordance with the instruction from the system controller 214.

The LCD controller 224 is a processing part for controlling display of the liquid crystal display (LCD) 230, which is mounted on the printing apparatus 210. As the system controller 214 instructs to the LCD controller 224 to display a screen, the LCD controller 224 obtains the image data of the image to be displayed from the memory controller 220 and displays the image on the LCD 230. The LCD 230 displays a printing image selection screen (index screen) for selecting an image to be printed, and displays the printing image that is being printed, and the like.

The image data stored in the memory 222 is outputted from a video output terminal 232 to outside as a video signal via the D/A converter 226; thereby the image to be printed and the like is displayed on the monitor (not shown) which is connected with the video output terminal 232.

The print controller 228, a head driving circuit 234, a paper transport controller 236, and a fixation controller 238 all of which shown in FIG. 6 are control blocks for executing printing. The control blocks synchronize with each other by the print execution instruction from the system controller 214 and execute respective controls.

The printing paper used in the printing apparatus 210 is formed in such a manner that a cyan (C) coloring layer, a magenta (M) coloring layer, and a yellow (Y) coloring layer are applied on the surface of a support of the paper. As heat energy corresponding to the respective layer is applied to the printing paper, the color of C, M, or Y of a density (gradation) corresponding to the heat energy does color. As applying to each of the M coloring layer and the Y coloring layer except the C coloring layer ultraviolet light of a wavelength corresponding to each of the layers (365 nm for the M coloring layer and about 425 nm for the Y coloring layer), the coloring state is fixed.

When the system controller 214 gives print execution instruction, the print controller 228 obtains, through the memory controller 220, the image data of the printing image that is recorded in the memory 222, and then sets gradations (print gradation value) for each of the Y, M, and C in each pixel of the printing image within a range of resolving power of 8 bits (0-256), for example, in accordance with the image data of the printing image. Then, the data of printing gradation values for each of Y, M, and C colors in each pixel of the printing image is outputted to the head drive circuit 234, in synchronism with the running of the printing paper, line by line in a direction (main scanning direction) which is vertical to the running direction of the paper (sub-scanning direction).

As the data of the printing gradation value for each of the Y, M, and C colors is given from the print controller 228, the head drive circuit 234 controls, in synchronism with the running of the printing paper, a voltage and a time length of turning on the electricity (pulse width) for applying to each heat element corresponding to each dot of the thermal head 240 arranged in the main scanning direction in accordance with the printing gradation value. An amount of the heat energy that is applied to each point on the printing paper from the heat element of each dot of the thermal head 240 is thereby controlled according to the printing gradation value of each of the Y, M, and C colors, and the color is formed in the density corresponding to the printing gradation value, which is instructed from the print controller 228 with respect to each coloring layer of the printing paper.

When the print execution instruction is given from the system controller 214, the paper transport controller 236 feeds the printing paper from a paper container (not shown) to a print processing part. Then, the paper transport controller 236 drives a capstan roller 242 with a motor (not shown) so as to run the printing paper in synchronism with the printing process for coloring and fixation. At this point, the system controller 214 detects that the printing paper is at a home position using a home position (HP) sensor 244, and controls the paper transport controller 236 to run the printing paper reciprocatively with the home position as the reference.

The fixation controller 238 controls on-off of a Y fixation fluorescent lamp 246 and an M fixation fluorescent lamp 248 in synchronism with the coloring process for the Y and M coloring layers of the printing paper by the thermal head 240. The Y fixation fluorescent lamp 246 radiates light including the ultraviolet light of which wavelength is approximately 425 nm. As the Y fixation fluorescent lamp 246 is lighted and applies the ultraviolet light on the printing paper, the Y coloring layer of the printing paper is fixed. On the other hand, the M fixation fluorescent lamp 248 radiates light including the ultraviolet light of which wavelength is approximately 365 nm. As the M fixation fluorescent lamp 248 is lighted and applies the ultraviolet light on the printing paper, the M coloring layer of the printing paper is fixed.

Figure 7:
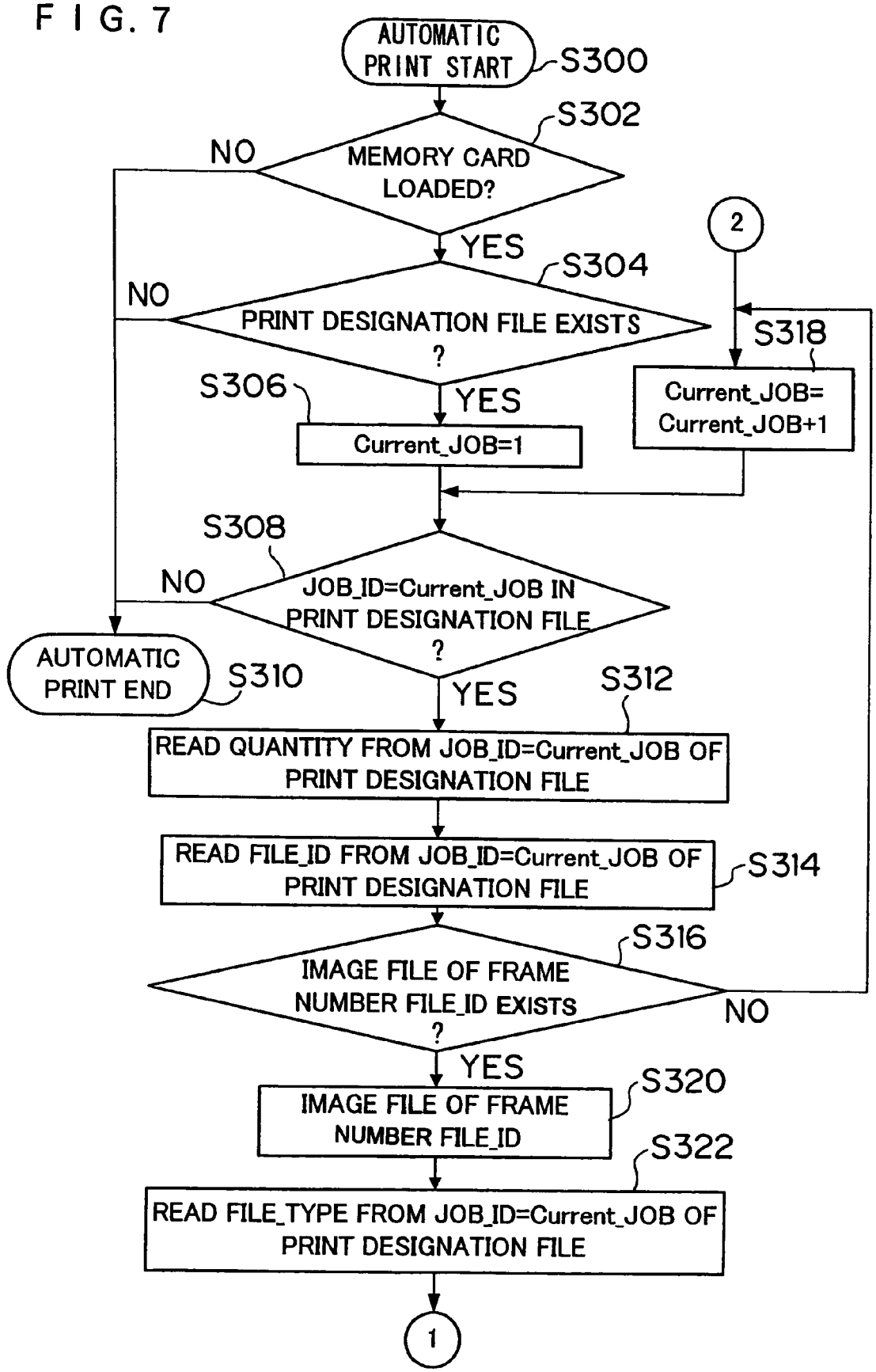
FIG. 7 is a flowchart showing a procedure for an automatic printing in the printing apparatus in FIG. 6.

The procedure for the printing process by the printing apparatus that is constructed as described above will be described with reference to flowcharts in FIGS. 7 and 8.

When an automatic printing process is started in the printing apparatus 210 (S300), whether or not the memory card 32 is loaded is determined first (S302). If the memory card 32 is not loaded in the card slot 212, the automatic printing operation is ended (S310). If the memory card 32 is loaded in the card slot 212, the determination at S302 is YES, and the process goes on to S304.

At S304, whether or not the print designation file 160 is stored in the memory card 32 is determined. If there is not the print designation file 160 in the memory card 32, the automatic printing operation is ended (S310); whereas if there is the print designation file 160 in the memory card 32, the process goes on to S306, in which a value for a current job is set at 1 (Current_JOB=1).

Next, whether or not there is a job of JOB_ID=Current_JOB in the print designation file 160 is determined at S308. If there is not the job of JOB_ID=Current_JOB in the print designation file 160, the automatic printing operation is ended (S310). If there is the job of JOB_ID=Current_JOB in the print designation file 160, the process goes on to S312, in which information "QUANTITY" is read from JOB_ID=Current_JOB, and the information; "FILE_ID" is read from JOB_ID=Current_JOB at S314.

Then, the process goes on to S316, and whether or not an image file of a frame number indicated with "FILE_ID" is stored in the memory card 32 is determined (S316). If there is not the corresponding image file in the memory card 32, the process goes on to S318, and the process returns to S308 after increasing the value of the current job by one (Current_JOB=Current_JOB+1) at S318.

On the other hand, if there is the image file of the frame number indicated with FILE_ID in the memory card 32 at S316, the process goes on to S320 and the corresponding image file is read. Next, the information "FILE_TYPE" is read from the job of JOB_ID=Current_JOB of the print designation file 160 (S322). After that, the process goes on to S324 in FIG. 8, and it is determined whether FILE_TYPE is a moving image or a still image (S324). If the file type is the moving image, the process goes on to S326; if the file type is the still image, the process goes on to S340.

A process is performed at S326 for skipping the header of the moving image file. Then the process goes on to S328 and the current frame number is set at 0 (Current_Frame=0). After that the information "FRAME_NUM" is read from the job of JOB_ID=Current_JOB, which is written in the print designation file 160 (S330), and whether or not the current frame number corresponds to the "FRAME_NUM" is determined in the following S332.

If Current_Frame≠FRAME_NUM at S332, the current frame number is increased by one (Current_Frame=Current_Frame+1) at S334, and the reading skips up to the top of the next frame (S336), then the process returns to S332.

If Current_Frame=FRAMENUM at S332, the process goes on to S342, in which a process for taking out a current chunk as JPEG data is performed. As described above, when executing printing of the moving image file depicted in FIG. 5 in accordance with the job of JOB_ID=03 shown in FIG. 3, the printing apparatus 210 skips the header and also skips the frames from the top while counting them, then can obtain the image data to be printed as the printing apparatus 210 reaches at the image data of the frame number that is written in the print designation file 160.

Alternatively, the printing apparatus 210 may first read the position (or the position and the length) of the chunk of the frame number that is written in the print designation file from the index information, which is recorded at the last part of the moving image file, and may obtain the image data to be printed by accessing the corresponding chunk of the actual data.

When using the print designation file 160 in FIG. 4 instead of the print designation file 160 in FIG. 3 to print in accordance with the job of JOB_ID=03 in FIG. 4, the printing apparatus 210 can access, after skipping the headers, the chunk in which the image data to be printed is stored in accordance with the position (or the position and the length) that is written in the print designation file 160.

Figure 8:
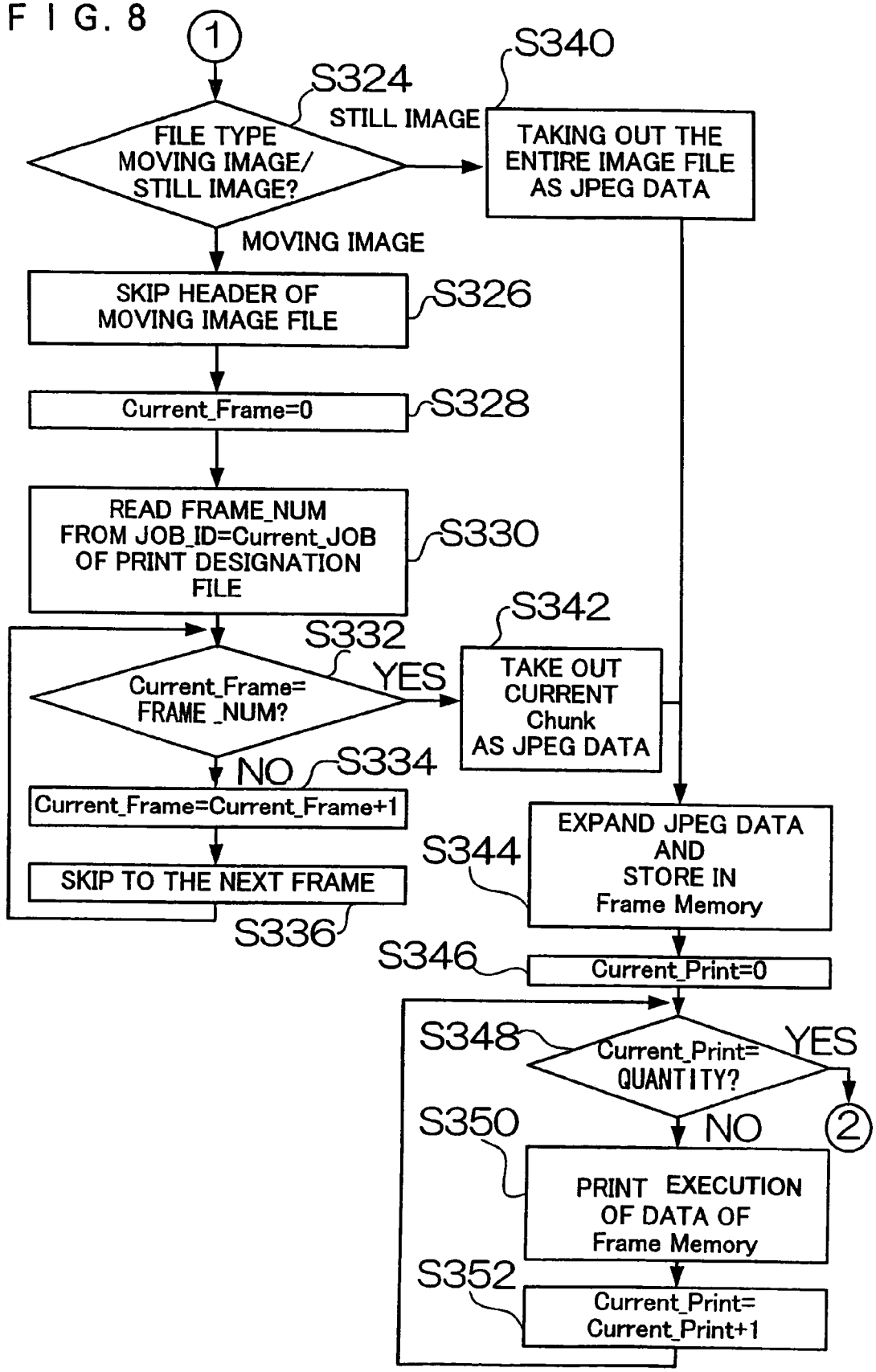
FIG. 8 is a flowchart showing a procedure for the automatic printing in the printing apparatus in FIG. 6.

When the file type is determined as the still image file at S324 in FIG. 8 and the process goes on to S340, the printing apparatus 210 performs the process for taking out the entire image file as JPEG data (S340). Then, the process goes on to S344 after S340 or S342.

At S344, the JPEG data that is obtained at S340 or S342 is expanded (defrosted), and the expanded data is stored in the frame memory, which corresponds to the memory 222 in FIG. 6.

Thereafter, the current print number is set as "0" (Current_Print=0) (S346). Then, whether or not the current print number corresponds to the designated number of prints ("QUANTITY") (S348). If the current print number does not reach the designated number of prints, the process goes on to S350 and printing of the data stored in the frame memory 222 is executed. Then at S352, the current print number is increased by one (Current_Print=Current_Print+1), and the process returns to S348.

The process of S348 through S352 is repeated until the current print number corresponds to the designated number of prints. When printing for the designated number of prints is completed, it is determined at S348 that Current_Print=Quantity (the determination is YES), and the process returns to S318 in FIG. 7.

Thus, the respective jobs written in the print designation file 160 are executed, and as the completion of the all jobs, the automatic printing is ended (S310).

According to the embodiment of the present invention, the designation of printing from the still image file and the moving image file can be achieved using a single print designation file. Moreover, as taking out the desired still image scene from the moving image file, the memory capacity of the memory card 32 can be used efficiently since another still image data does not have to be prepared.

In the above description, the frame number is defined as to chunks of the image data in the moving image file except the chunks of the audio data; alternatively, the chunk numbers as to all the chunks including chunks of the audio data may be defined so as to specify the image data to be printed.

In the above embodiment, the description is given to the motion JPEG as an example, which lists the images of respective screens as independent JPEG images; however the format for recording the moving image is not restricted to the motion JPEG. The MPEG (Moving Pictures Experts Group) or other formats may be used.

In an algorithm for the MPEG, the encoded image data is configured based on the screen data of the image before the subject image and the screen data of the image after the subject image, and the image data has a Group of Pictures (GOP) structure composed from the data of a few screens. In MPEG, three types of pictures are specified which are I picture, P picture, and B picture, in order to achieve a bi-directional prediction. The I picture means an Intra-encoded image (an encoded image within a frame), the P picture means a Predictive encoded image (an encoded image in one-way prediction between frames), and B picture means a Bi-directionally predictive encoded image (an encoded image in bi-directional prediction).

Accordingly, for example, a desired I picture is designated as a frame to be printed in the print designation file, and the designated I picture can be extracted from the moving image and printed.

In the above-described embodiment, the digital camera 10 is exemplified as equipment for print designation. However, the print designating information can be inputted with other equipment such as the printing apparatus and a personal computer so as to prepare a new print designation file in the recording medium such as the memory card, or to correct the writing contents of the recorded print designation file.

In the above-described embodiment, the present invention is applied to the printing apparatus with TA method; however the present invention can be applied to other printing apparatus with variety of recording formats such as heat transfer (melting type or sublimation type), laser exposure heat developing transfer (pictorography), inkjet, and heat-sensitive record.

Moreover, the desired still image data can be picked up from the moving image file by applying the print designating method of the present invention; thus, the data transfer to other external equipment and uploading to a network server are possible in addition to printing the designated still image data, and further applications to variety of external output equipment other than the printer is possible.

As described hereinabove, according to the present invention, the information for specifying the scene to be printed in the moving image file is written in the print designation file, and the designated image data is extracted from the moving image file in accordance with the information; thus another still image data for the scene does not have to be prepared. Therefore, the print designation for the still image and print designation for the still image of the specific scene within the moving image can be achieved with the single print designation file.

Further, the print designating method and the printing method of the present invention can be performed not only as a control program for an electronic camera capable of recording the moving image, but also as a print processing program for a personal computer and an apparatus exclusively used for printing; thus the program may be recorded in a recording medium readable by an electronic means, an optical means, or a magnetic means, or combined means of them such as a CD-ROM, a magnetic disk, a magneto-optical disk, and the like, so that the program can be distributed.

Furthermore, the program can be distributed using a communication network such as the Internet without requiring a physical recording medium. In such distributing, the program can be provided to a third person by downloading the program from a Web site, or by delivering the program as an electronic mail.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A print designating device, comprising:
    a print designation file preparing device which stores, in a print designation file in a recording medium in which a file including still image data and a file including moving image data are stored, print designating information to designate an image to be printed which is stored in the recording medium,
    wherein the print designating information includes:
        file specifying information for specifying a subject file including the image to be printed; and
        file type identifying information for identifying whether the subject file comprises a moving image file or a still image file, and
    wherein if the file type identifying information identifies that the subject file comprises the moving image file, the print designating information further includes scene specifying information for specifying a subject scene to be printed in the moving image file.

2. The print designating device as defined in claim 1, wherein:
    the print designating device comprises an electronic camera comprising an imaging device and a recording device which encodes and stores image data obtained through the imaging device in the recording medium; and
    the electronic camera stores the file including the image data and the print designation file in the recording medium.

3. The print designating device as defined in claim 1, wherein the print designation file preparing device stores the print designating information in the print designation file in the recording medium without duplicating image data of the image to be printed.

4. The print designating device as defined in claim 1, wherein the print designation file preparing device stores the print designating information in the print designation file in the recording medium without duplicating image data of the image to be printed and thereby minimizing waste of a memory capacity of the recording medium.

5. The print designating device as defined in claim 1, wherein the recording medium includes only a single copy of image data of the image to be printed.

6. The print designating device as defined in claim 1, wherein the print designation file preparing device stores the print designating information in the print designation file in the recording medium without redundantly storing image data of the image to be printed.

* * * * *